Patented Oct. 21, 1930

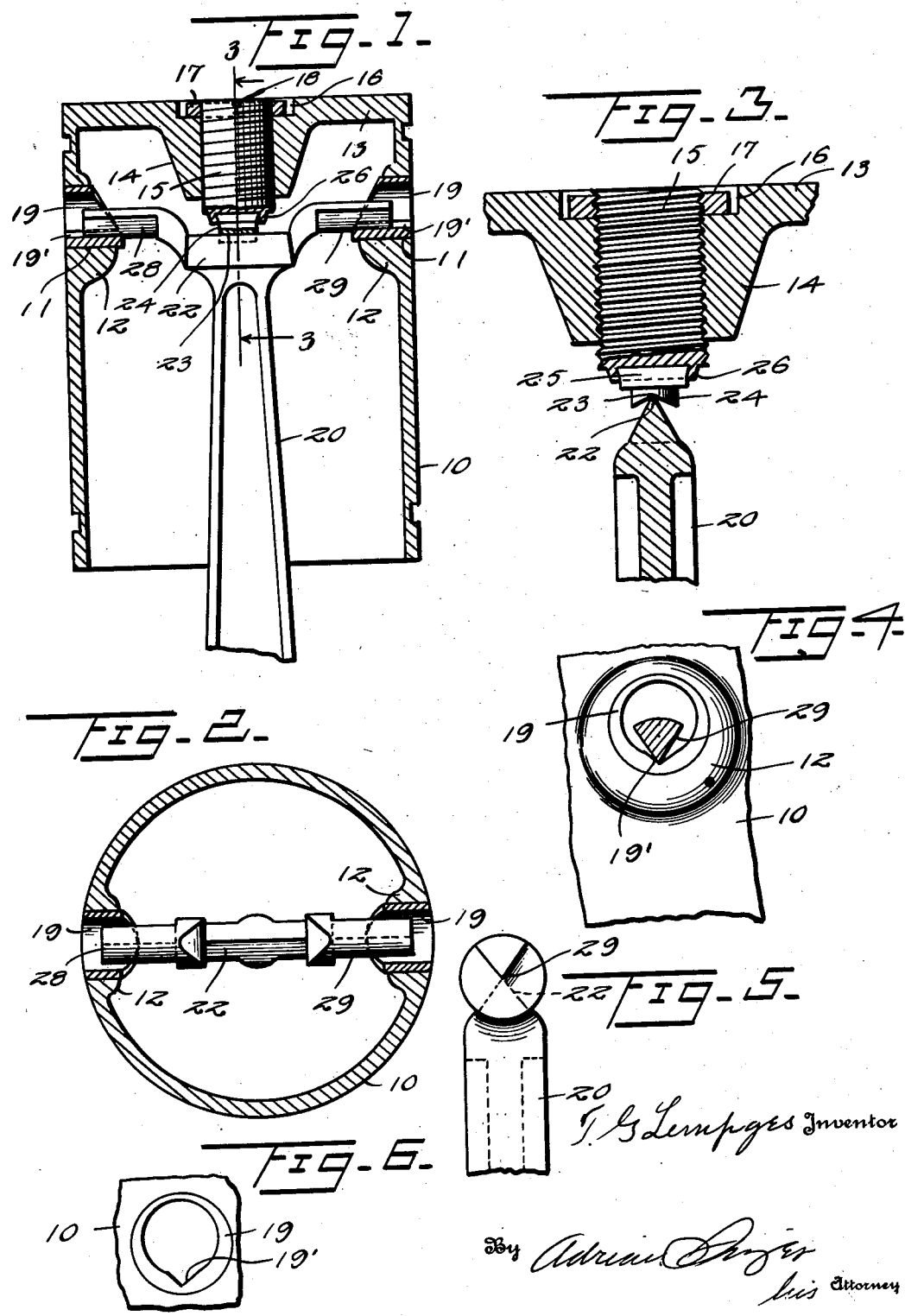

1,778,902

UNITED STATES PATENT OFFICE

THEODORE G. LEMPGES, OF DUNKIRK, NEW YORK, ASSIGNOR OF ONE-HALF TO HENRY P. LALLY, OF DUNKIRK, NEW YORK

PISTON WRIST PIN

Application filed February 5, 1930. Serial No. 426,063.

The object of this invention is to provide special means for securing a connecting rod to the piston of an engine, of the internal combustion type, these means being adapted for use under various other conditions where reciprocable elements connected with each other are subject to relative movement by reason of some suitable form of pivoted connection.

A further object is to provide means for securing a connecting rod and piston in such manner that wear at the wrist pin may readily be taken up without removing the piston from its cylinder, or detaching the connecting rod.

A further object is to reduce the friction at the wrist pin, so that a minimum degree of wear will take place.

A further object is to employ a standard piston, and to secure thereto a special connecting rod having formed therewith an element serving as a wrist pin, and cooperating with bearing and retaining members one of which is adjustable with reference to the others, and is accessible upon removing the cap plate of the engine.

With the foregoing and other objects in view, the invention consists in the novel arrangement and in the construction of elements herein disclosed, it being understood that changes or modifications may be made within the scope of the claims without departing from the spirit of the invention.

In the accompanying drawings,

Figure 1 is a view of the piston in vertical section, with parts in elevation;

Figure 2 is a view in horizontal section, and through the bushings mounted in the piston walls and receiving the ends of the wrist pin;

Figure 3 is a detail in vertical section, and on line 3—3 of Figure 1;

Figure 4 is a detail view showing one bushing in end elevation, together with a fragment of the cylinder wall, the wrist pin being in section;

Figure 5 is a further detail, showing especially the upper knife blade, near the middle of the wrist pin;

Figure 6 shows one of the bushings apart from other structure, save a fragment of the cylinder wall.

The cylinder 10 is provided with lateral openings 11, and with inner shoulders, thickened portions or enlargements 12 adjacent to the openings, and serving to strengthen the walls at these points of strain.

The upper wall or head 13 of the piston includes a depending boss 14, having a threaded vertical bore receiving an adjusting screw 15. The screw is to be countersunk, and an annular depression 16 receives a lock nut or the like 17,—the screw being provided with a slot or other tool engaging portion 18.

Within each opening in the side of the piston wall, I mount a bushing 19 having a notch 19' in the lower thickened wall thereof, the bore of the bushing being eccentric with reference to the bore constituting the adjacent opening 11 in the wall. The bushings are cut away at an angle as shown in Figure 1 in order to facilitate the seating of the wrist pin the bearings for which are of the knife-blade type. The connecting rod and wrist pin are to be in one piece, the rod being designated 20, and adapted for connection with a crank shaft, not shown, and a special feature is that in order to effect adjustment no feature of permanent assembly need be disturbed, because the removal of the cap plate of the engine will afford access to the pistons, in the type of engine under consideration, and the adjusting screw 15 and its lock nut 17 will in each instance be fully accessible.

The central portion of the wrist pin is provided with an upper knife-blade bearing member 22 adapted to cooperate with the V-notch or socket 23 in block 24, the latter having an enlarged head 25 around which the lower flanged end portion 26 of the screw is crimped. The block is thus held, but rotation is permitted for obvious reasons, and rolling of the flange and not close crimping is to be inferred.

The lower and outer knife-blade elements of the wrist pin are shown at 28, 29, and the required rocking movement at points 23, 28, 29 is permitted, all bearing elements being of hardened steel, and perfect adjustment being maintained, with proper attention, without machine work, or expert assistance.

On the power stroke the force is applied directly along the longitudinal axis of the connecting rod, thereby relieving the strain and consequent wear at the usual points, adjacent to the walls of the piston.

A connecting rod may break or require renewing, and in view of the cutaway portions of the bushing, the parts may be so proportioned that the rotation of the bushing will free the ends of the wrist pin, the enlargements on the piston walls being of limited extent. The complete removal of screw 15 and block 25 affords access to the remaining parts, and partial withdrawal of the screw permits considerable angular movement of the wrist pin.

What I claim is—

1. In a device of the class described, a piston including a head, a combined connecting rod and wrist pin, means for mounting the wrist pin in the walls of the piston, and adjustable means extending through the head of the piston and bearing on the wrist pin in approximate alinement with the longitudinal axis of the connecting rod.

2. A structure comprising the elements of claim 1, in which the adjustable means includes a plurality of devices relatively movable.

3. In a device of the class described, a piston, a combined connecting rod and wrist pin, knife-blade bearings for mounting the end portions of the wrist pin in the walls of the piston, and knife-blade adjusting means for the wrist pin, effective along the longitudinal axis of the connecting rod.

4. A piston including a head, alined bushings extending through the walls of the piston, said head having a bore perpendicular to the axis of the alined bushings, a connecting rod and a wrist pin thereon, the wrist pin extending into the bushings and contacting with the inner portions thereof, and means bearing on the wrist pin at a point between the bushings and including an element adjustable in the bore of the head.

5. A piston including a head, alined bushings having eccentric bores mounted in the walls of the piston, and a connecting rod and wrist pin, the latter having a three-point contact with reference to the bushings and the head.

6. A piston including a head, bushings mounted in the walls of the piston, and a connecting rod and wrist pin, the latter having a three-point knife-blade contact with reference to the bushings and the head.

7. A piston including a head, bushings mounted in the walls of the piston, a connecting rod and wrist pin, the latter having knife-blade contact with reference to the bushings, and adjustable means interposed between the wrist pin and head and including elements contacting along a line parallel with the line of contact between the knife-blades and the bushings.

8. In a device of the class described, a plurality of relatively movable elements connected with each other and operable for the transmission of power, means providing bearings for one of said elements about an axis extending transversely of the path of movement of the other element, cooperating portions of the bearings contacting under pressure, and means adjustable in the direction of said path of movement, for maintaining uniform contact at the bearings, regardless of wear, the element received by the bearings including an edge portion for direct contact with the bearings and a heavier portion within and spaced inwardly from said bearings, providing strength and freedom of movement.

In testimony whereof I have affixed my signature.

THEODORE G. LEMPGES.